United States Patent [19]

Gregerson et al.

[11] Patent Number: 4,817,799
[45] Date of Patent: Apr. 4, 1989

[54] DISK PACKAGE

[75] Inventors: Barry Gregerson; Larry Dressen; Roger L. Mortensen, all of Chanhassen, Minn.

[73] Assignee: Empak, Inc., Chanhassen, Minn.

[21] Appl. No.: 915,497

[22] Filed: Oct. 6, 1986

[51] Int. Cl.[4] .................. B65D 85/30; B65D 45/16
[52] U.S. Cl. ............................ 206/445; 206/334; 206/454; 220/376
[58] Field of Search .......... 206/334, 328, 444, 445, 206/1.5, 454; 24/454, 563, 543, 329; 220/326, 324

[56] References Cited

U.S. PATENT DOCUMENTS

| | | | |
|---|---|---|---|
| 3,149,717 | 9/1964 | Castelli | 206/365 |
| 3,925,765 | 12/1975 | Beal | 24/329 |
| 3,961,877 | 6/1976 | Johnson | 206/454 X |
| 4,043,451 | 8/1977 | Johnson | 206/334 |
| 4,061,228 | 12/1977 | Johnson | 206/334 |
| 4,171,740 | 10/1979 | Clement et al. | 206/334 |
| 4,248,346 | 2/1981 | Johnson | 206/586 |
| 4,331,257 | 5/1982 | Taschner | 220/324 |
| 4,450,960 | 5/1984 | Johnson | 206/334 |
| 4,520,925 | 6/1985 | Johnson | 206/334 |
| 4,557,382 | 12/1985 | Johnson | 206/444 |
| 4,582,219 | 4/1986 | Mortensen et al. | 220/326 |
| 4,588,086 | 5/1986 | Coe | 206/444 |
| 4,658,955 | 4/1987 | Eichner | 206/307 |

FOREIGN PATENT DOCUMENTS

| | | | |
|---|---|---|---|
| 74255 | 11/1960 | France | 24/563 |
| 82588 | 1/1964 | France | 220/306 |

Primary Examiner—Stephen Marcus
Assistant Examiner—Bryon Gehman
Attorney, Agent, or Firm—Hugh D. Jaeger

[57] ABSTRACT

Rigid memory disk package including a package base, a package cover and locks and clips for engaging the package cover to the package case. The low profile of the package base provides for robotic access to the disk. A plurality of dividers in the base support the disks. The top includes a plurality of dividers on each side and two rows of flexible fingers in the top for spring biasing against opposing edges of the disk accordingly when the cover is engaged to the base.

8 Claims, 8 Drawing Sheets

DISK PACKAGE

BACKGROUND OF THE INVENTION

1. Field of the Invention

The present invention pertains to a package, and more particularly, pertains to a rigid memory disk package for rigid memory disks used in the computer field. The package can also be used for optical disks.

2. Description of the Prior Art

The prior art packages have generally been designated for silicone wafers for integrated circuits. The prior art packages were not particularly adaptable to rigid hard memory disks or rigid hard optical disks. Both of these forms of storage media have recently achieved popularity in the computer fields and consequently, have required their own high technology packaging requirements accordingly.

Also, the prior art packages do not easily lend themselves to robotic processing and did not have a low base profile of the base supporting the disks in either a horizontal or vertical position for robotic processing.

The present invention provides a rigid disk package for storing either memory disks or optical disks and is of a low profile design, particularly intended for robotic handling and processing in either a horizontal or vertical position. Also, the rigid disk package has clean contours for preventing contamination and provides for accommodation of a sealing band providing for an air tight, dust free, moisture free atmosphere in the package.

SUMMARY OF THE INVENTION

The general purpose of the present invention is a rigid disk package for storing of either memory disks or optical disks. The package is of a smooth surface design and smooth contour, so as to prevent contamination by picking up of dirt. The package includes an area for accommodating a seal member for providing for a secure inner environment, and is of a low profile design which lends itself to robotic processing in either a horizontal or vertical position.

According to one embodiment of the present invention, there is provided a package base, a package cover, and two locking clips which secure within areas of the package base and snap into the package cover.

According to another embodiment of the present invention, there is provided a rigid disk package including a package base, a package cover and locking clips which engage into areas at either end of the package base and include a upwardly extending spring member which snaps into areas of the package cover. The package base includes a curved bottom with divider teeth for supporting a plurality of disks therebetween. Each of the locking clips is engaged within a lower area of the base at each end and includes an area in which to provide for spring biased movement for subsequent engagement into the ends of the package cover. The package cover includes a plurality of like teeth, spaced on opposing sides and two lines of opposing spaced fingers in the top of the package for engaging against the disks and holding the disks against movement within the package base and within the package cover. A configured groove is provided in the base for accommodating a flexible seal ring preventing moisture and contamination from passing through between the engagement of the package base to the package top.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
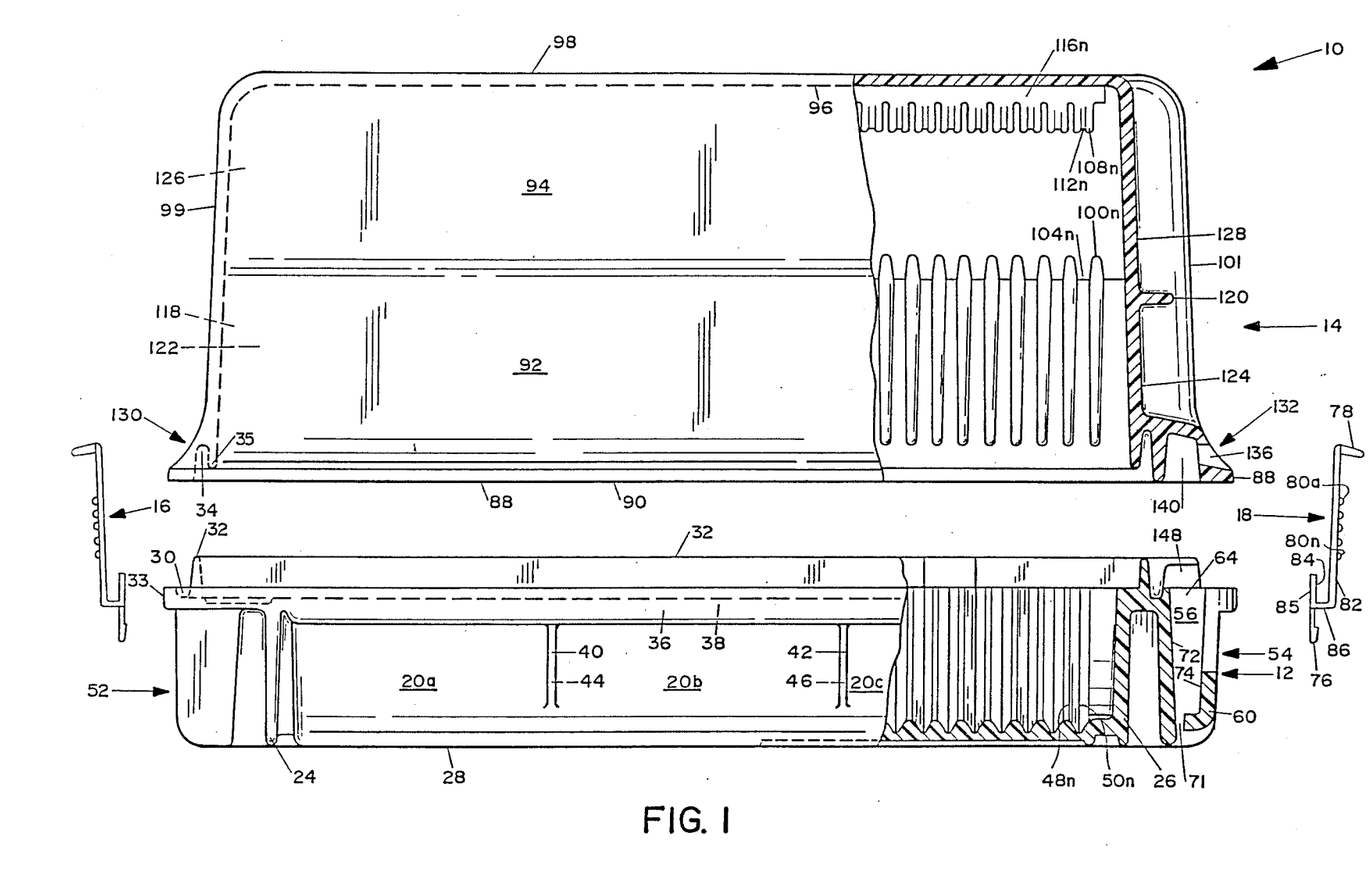
FIG. 1 illustrates a side view of a rigid memory disk package in partial cross section illustrating separated components including a package cover, package base and two locking clips.
Figure 8:
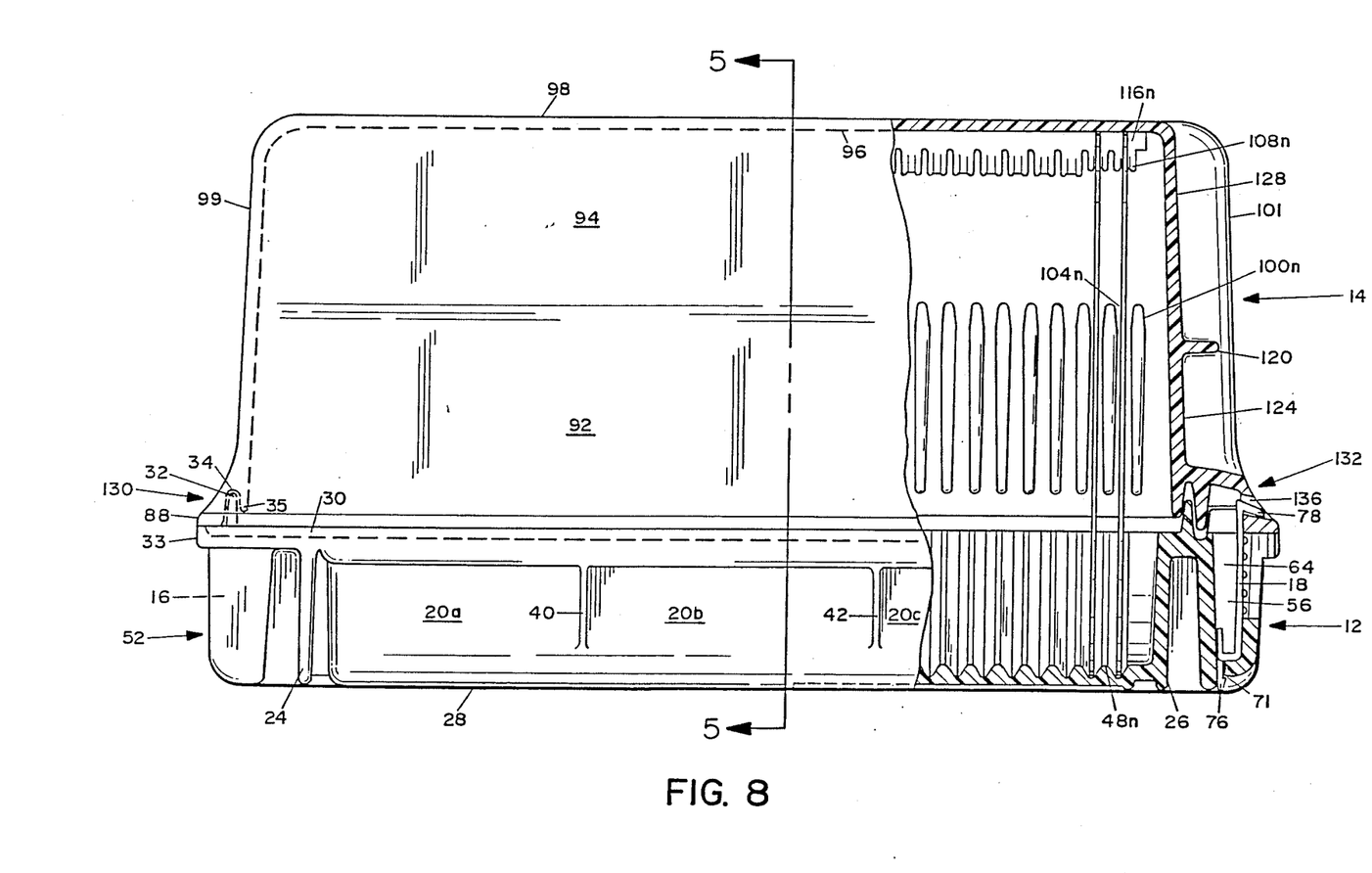
FIG. 8 illustrates a side view in partial cross section of the package cover engaged with the package base including wafer disks and the locking clips.

FIG. 1 illustrates in partial cross section a rigid memory disk package 10 including major components of a package base 12, a package cover 14, and removable locking clips 16 and 18. For purposes of reference, FIG. 8 illustrates the components 12, 14, 16 and 18 assembled, in a partial cross sectional view. Reference is now made to FIGS. 1-8 in the following discussion with reference particularly now to FIG. 1 as set forth below.

FIG. 1 illustrates the package base 12 which includes rounded curved bottoms 20 and 22 extending longitudinally between vertical end members 24 and 26 with a flat section 28 therebetween. Configured groove 30 and a like aligned configured inner lip 32 and edge 33 extend about and around the upper portion of the curved bottoms 20 and 22, adjacent to the end members. The lip 32 serves to seal the base 12 with a corresponding groove 34 and lip 35 and in the top cover 14. Integral half round support rods 36 and 38, and support struts 40-46 position along, about, and beneath the configured groove 30 providing additional groove support and integral package strength.

A alternating plurality of partial cylindrical shaped divider teeth 48a–48n and disk grooves or slots 50a–50n extend upwardly and inwardly from the inner surface of curved bottom members 20 and 22 and flat member 28 for retaining rigid disks as later illustrated and discussed in detail. Configured securing locking clip containment housings 52 and 54 position at the opposing ends of the base 12, and extend downwardly from, and about the configured groove 30. The locking clips 16 and 18 accommodate and engage within housings 52 and 54 with housing 54 now being described in detail. The housing 52 is a mirror image thereof.

The housing 54 includes a rectangular like hole or pocket 56 for insertion of the locking clip within housing 54. The housing member 54 includes a configured side member 60 between two vertical members 62 and 64 including vertical lips 66 and 68 and includes a catch 71 formed by the lower edge of member 60. A similar catch 73 positions likewise in housing member 52. A space 70 between edges 62 and 64, and inside surfaces 72 and 74 is provided for spring bias movement of the locking clip 18 and manual positioning of the locking clip as now described.

The locking clip 18 includes a lower latch member 76 and an upper latch member 78. A plurality of outward extending finger ridges 80a–80n, are provided on an outward surface of a latch connecting member 82. A U-shaped channel member 84 acts as a spring bias structure between surfaces 82 and 85 about base 86. The surface 82 biases against surface 85 when the clip is retained within the housing 54. The locking clip 16 is identical to the locking clip 18.

The package cover 14 includes a lower surrounding edge 88 with a lower flat surface 90, rounded configured lower sides 92, angled rounded configured upper sides 94, a rounded top edge 98 and opposing ends 99 and 101. An alternating plurality of aligned opposing divider teeth 98a–98n and 100a–100n, disk grooves 102a–102n and 104a–104n align to those of the base 12 and position along the inner lower sides 92. Two pluralities of aligned opposing spring biased teeth 106a–106n and 108a–108n including "U" grooves 110a–110n and 112a–112n with inclined ramps 114a–114n and 116a–116n respectively extend downwardly from the inner top 96 as illustrated in FIG. 3. Handles 118 and 120 extend outward from the indented lower ends 122 and 124. Upper indented ends 126 and 128 are indented in, and separated from the lower ends 122 and 124 by the horizontal handles 118 and 120. Latching areas 130 and 132 include latch holes 134 and 136. Configured spaces 138 and 140 of FIG. 3 are provided for the spring biased movement of the locking clips 16 and 18 and also for alignment with opposing upwardly from extending projections 142–148 of the base 12 as shown in FIG. 2.

Figure 2:
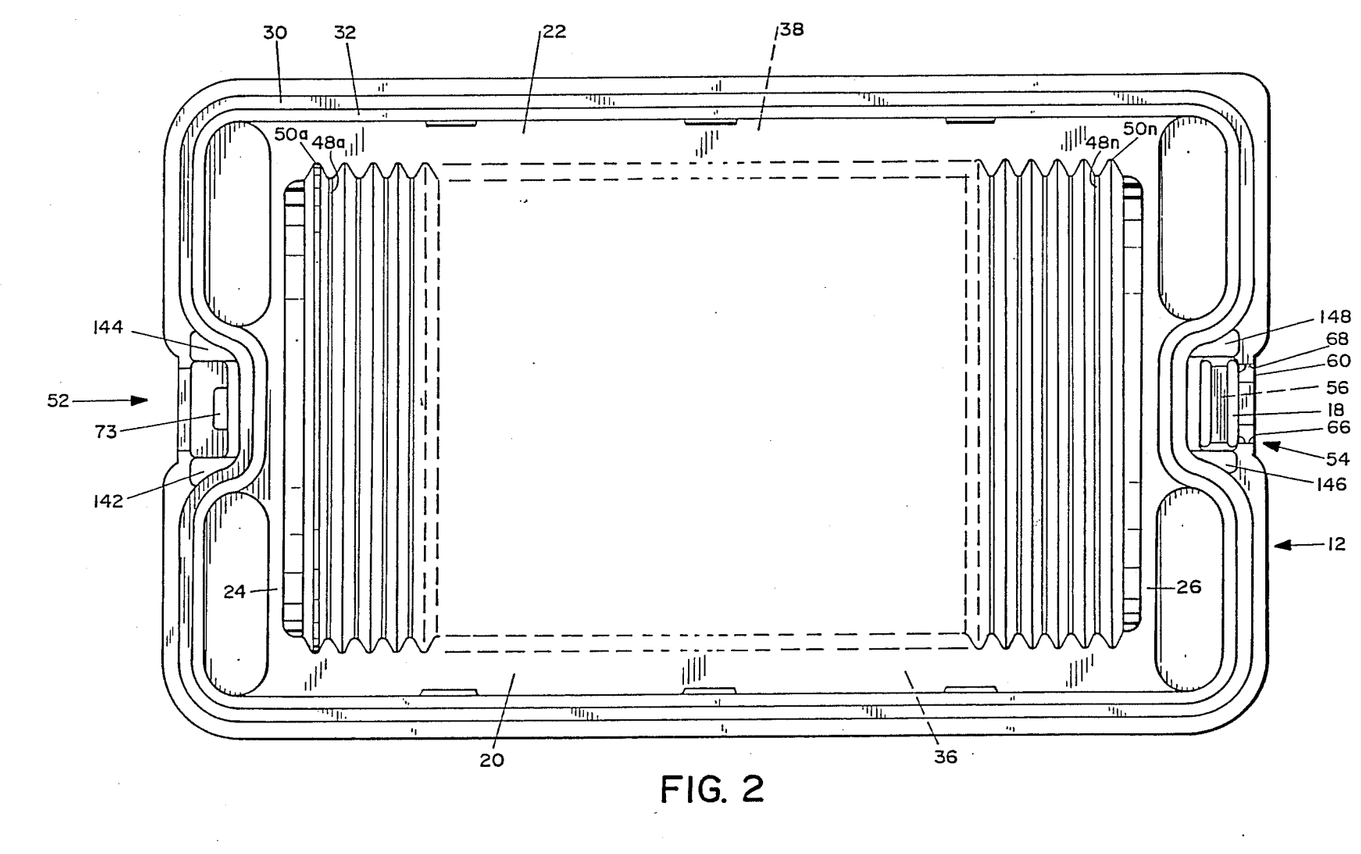
FIG. 2 illustrates a top view of the package base including a disk therein.
Figure 3:
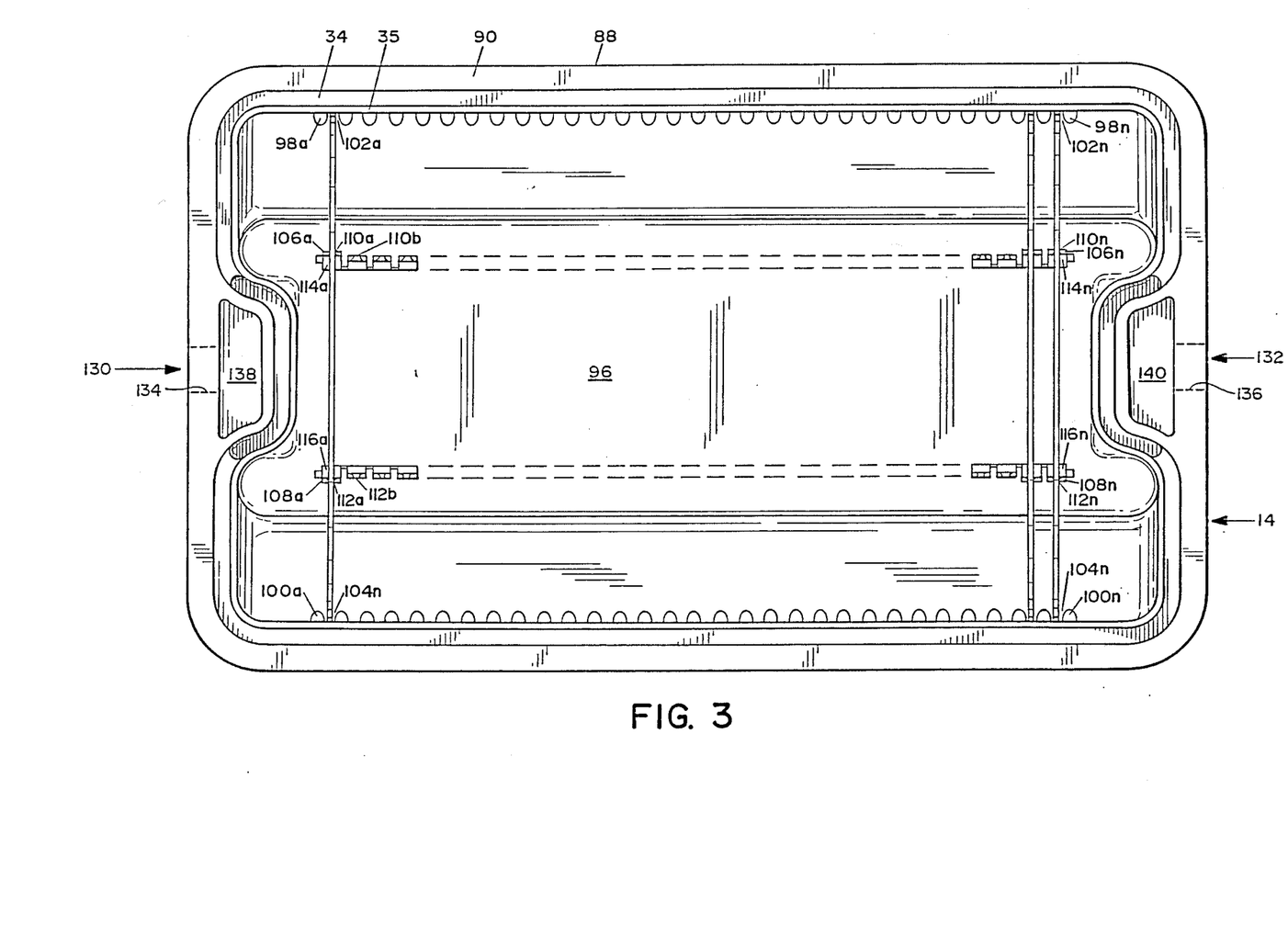
FIG. 3 illustrates a bottom view of the package cover including disks as such would be engaged against dividing teeth.

FIG. 2 illustrates a top view of the package base including a disk therein. All numerals correspond to those elements previously described. Particularly illustrated is the geometrical configuration of the configured groove 30, which can accommodate a rubber seal member which can have a circular cross-section.

FIG. 3 illustrates a bottom view of the package cover including disks, as such would be engaged against the teeth 98 and 100, and against the spring biased teeth 106 and 108.

Figure 4:
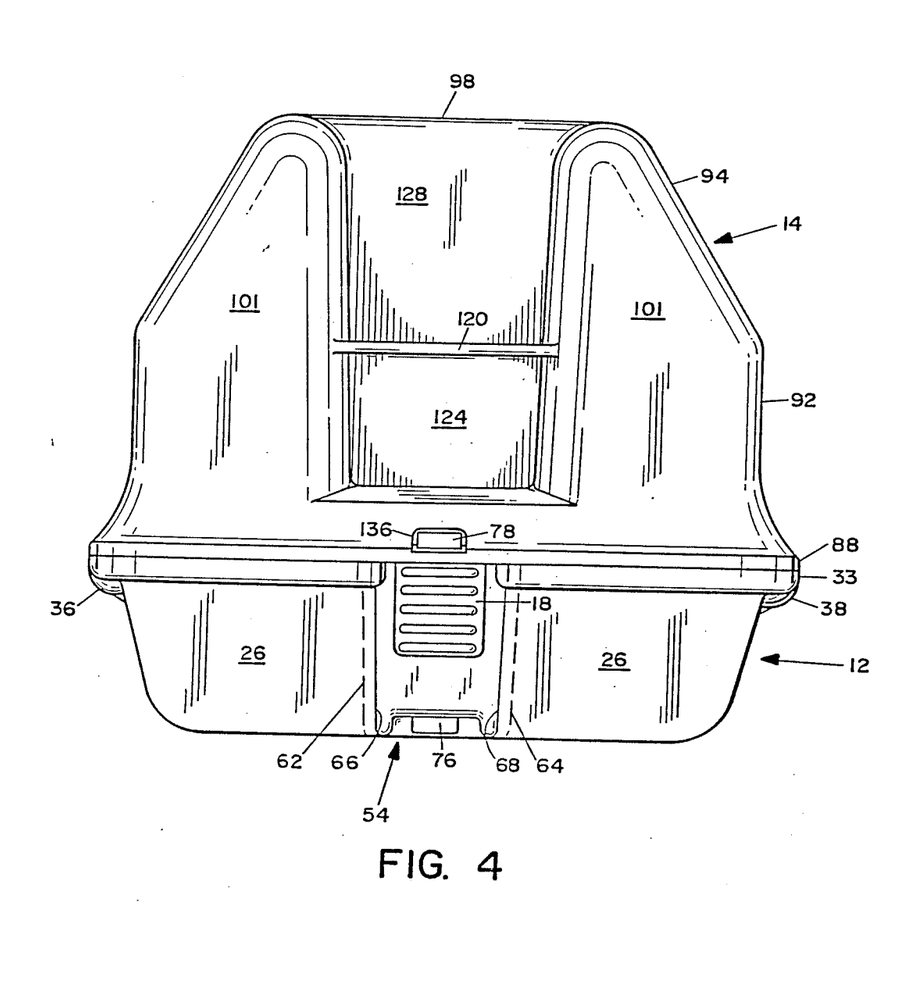
FIG. 4 illustrates an end view of the package cover engaged to the package base.

FIG. 4 illustrates an end view of the package cover engaged to the package base by the locking clip 18 and which is identical to the operation of the locking clip 16.

Figure 5:
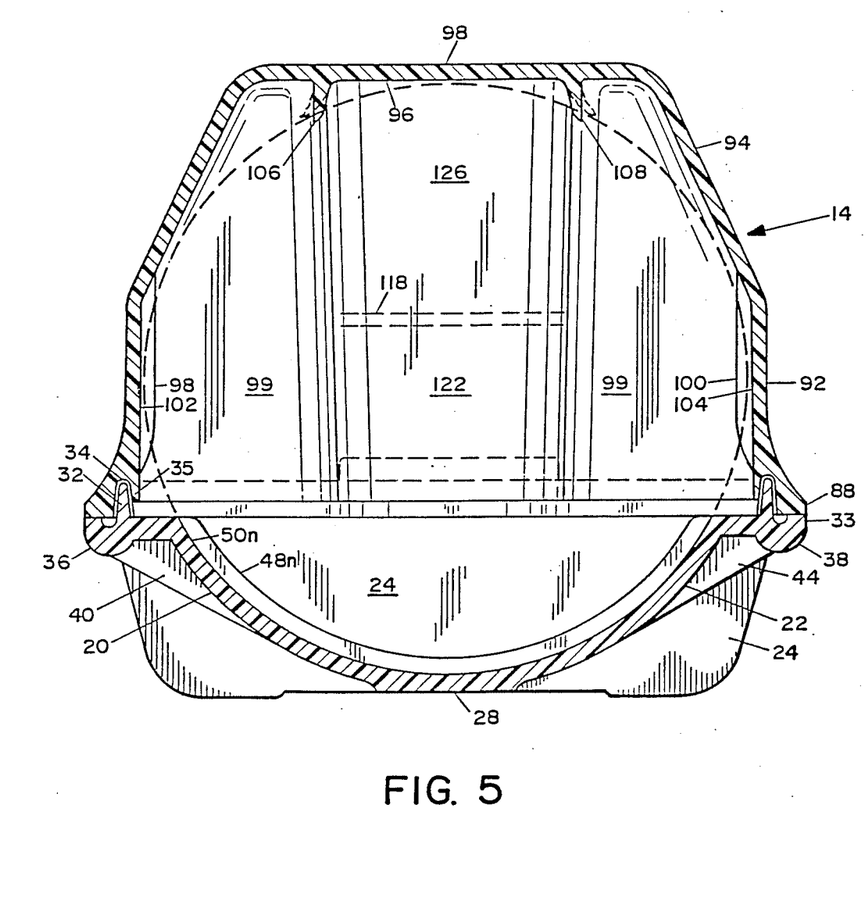
FIG. 5 illustrates an end view in cross section of FIG. 4 of the package cover engaged over the package base with a disk shown in dashed lines and taken along line 5—5 of FIG. 8.

FIG. 5 illustrates a view taken along 5—5 of FIG. 8 where all numerals correspond to those elements previously described.

Figure 6:
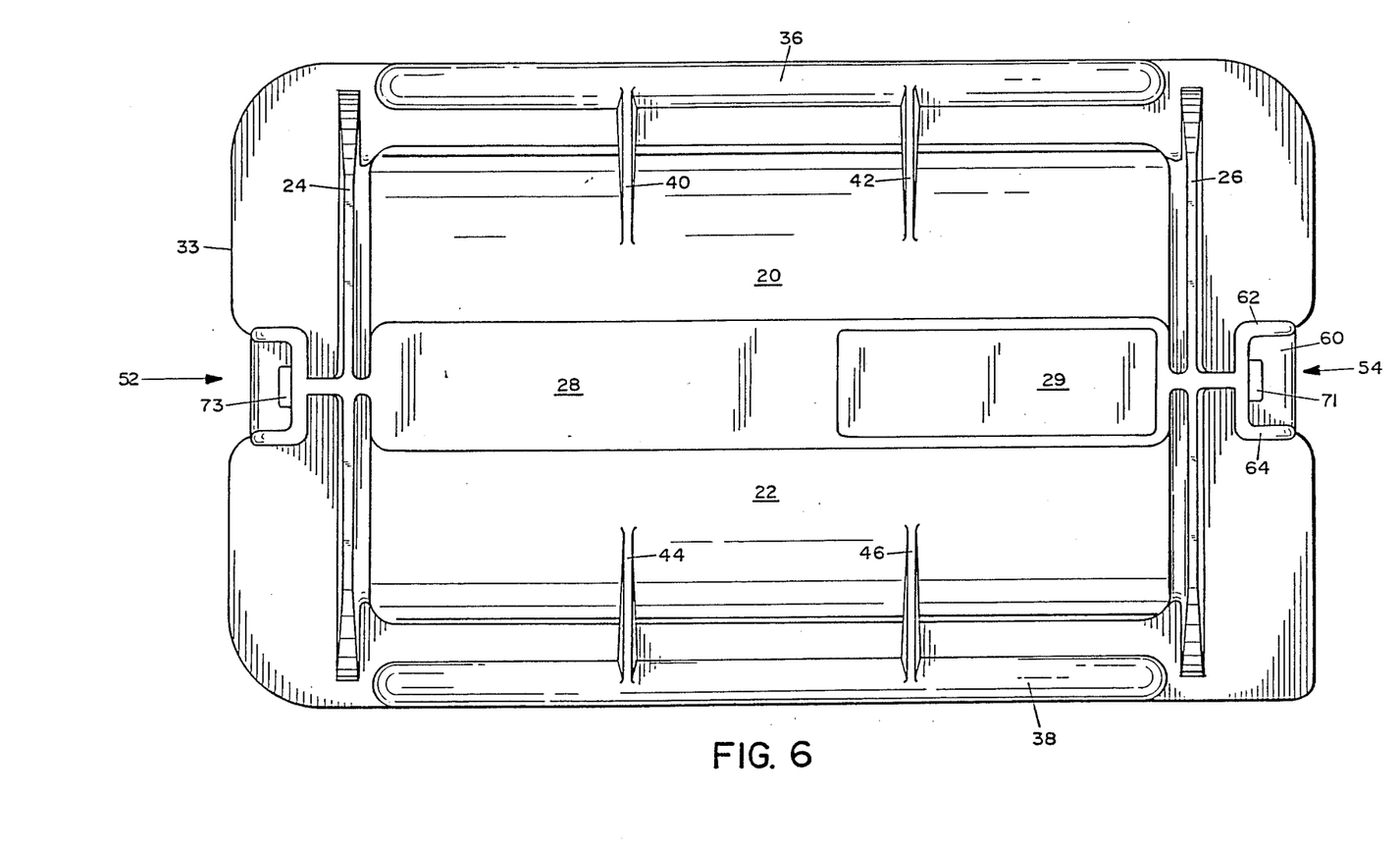
FIG. 6 illustrates a bottom view of the package base.

FIG. 6 illustrates a bottom view of the package base while all numerals correspond to those elements previously described. A recessed rectangular area 29 is provided for a self sticking adhesive label, or the like.

Figure 7:
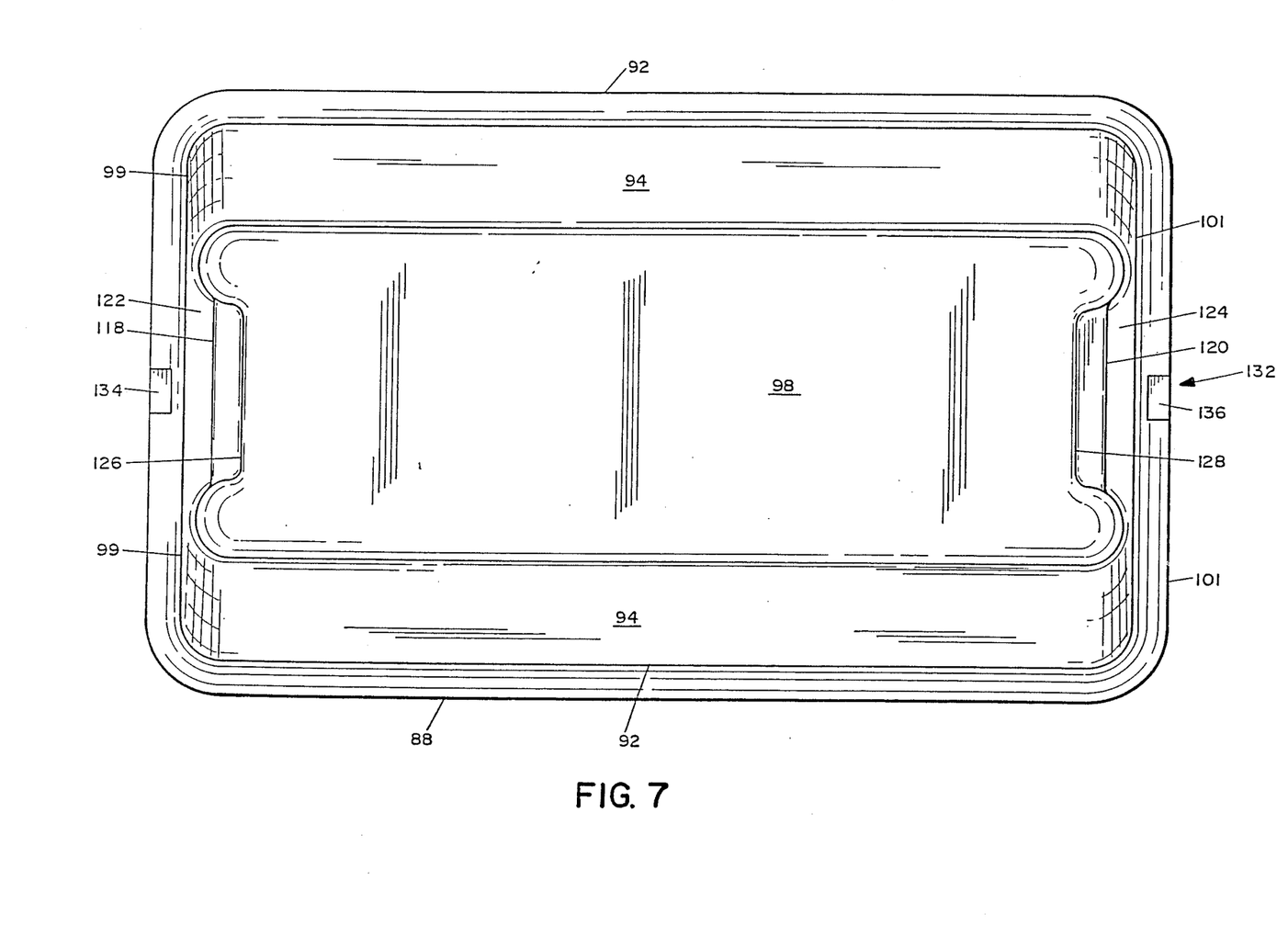
FIG. 7 illustrates a top view of the package cover.

FIG. 7 illustrates a top view of the package cover where all numerals correspond to those elements previously described.

FIG. 8 illustrates a side view and partial cross-section of the package cover engaged to the package base including wafer disks therein and the locking clips operatively engaged.

MODE OF OPERATION

The operation of the rigid disk package is best illustrated by FIG. 8 as well as FIG. 5, where the assembly of the base cover and the two locking mechanisms forms an integral package member. The disk supports are molded into the package base and package cover. The package cover includes the plurality of spaced opposing lines of flexible teeth for engaging against each of the disks at two diametrically opposed points as illustrated by dashed line in FIG. 5.

We claim:

1. Disk package comprising:
    a. a base including a rounded curved bottom between vertical end members, a flat base between said end members, a configured groove extending about an edge of said base and with a like configured lip extending about said edge of said base inwardly of said groove, a plurality of opposing alternating divider teeth and disk grooves extending upwardly and inwardly from an inner surface of said rounded curved bottom of said base, and locking clip containment means at opposing ends on said vertical end members;
    b. a cover including a lower flat surrounding edge with a lower flat surface, partially lower sides adjacent said flat surface, inwardly angled upper sides adjacent said lower sides, opposing ends defined between each adjacent paired lower side and upper side, a top surface joining said opposing ends and said upper sides, an opposing plurality of aligned alternating divider teeth and disk grooves on said lower sides extending inwardly from inner surfaces of said lower sides, an aligned opposing plurality of spring biased teeth with inclined ramps and "U" grooves extending downwardly from the inner surface of said top surface, a handle extending outwardly from an indented part of each said opposing end, and latch hole means in each of said opposing ends; and,
    c. removable spring biased locking means engaged into said locking clip containment means and latched into said latch hole means for joining said base and said cover into a locked relationship.

2. Disk package of claim 1 wherein said locking means comprises a lower latch member, an upper latch member, a latch connecting member therebetween said latch members and spring means adjacent said lower latch member.

3. Disk package of claim 2 wherein said spring means comprises a U-shaped member wherein said latch connecting member is at one side and an upper surface of said lower latch member extends from another side.

4. Disk package of claim 2 wherein said, latch connecting member includes a plurality of outward extending finger ridges.

5. Disk package of claim 1 wherein said cover and base are made of polyethylene.

6. Disk package of claim 1 wherein said cover and base are white in color and wherein said locking means are made of polycarbonate.

7. Disk package of claim 1 wherein the package contains hard rigid memory disks.

8. Disk package of claim 1 wherein the package contains optical disks.

* * * * *